United States Patent [19]
Worlidge

[11] 3,954,613
[45] May 4, 1976

[54] FILTER APPARATUS

[76] Inventor: Ronald Frederick Worlidge, "High Ridge", 9 Durlston Road, Parkstone, Poole, Dorset, England

[22] Filed: Oct. 17, 1973

[21] Appl. No.: 407,082

[30] Foreign Application Priority Data
Oct. 18, 1972   United Kingdom............... 48028/72

[52] U.S. Cl................................. 210/108; 210/391
[51] Int. Cl.²......................................... B01D 33/02
[58] Field of Search..... 210/106–108, 137, 391, 393

[56] References Cited
UNITED STATES PATENTS

| | | | |
|---|---|---|---|
| 1,225,696 | 5/1917 | Bicalky | 210/391 |
| 1,270,796 | 7/1918 | Drury et al. | 210/391 X |
| 2,592,972 | 4/1952 | Strassheim | 210/107 |
| 3,410,409 | 11/1968 | Rittenhouse et al. | 210/137 X |
| 3,436,260 | 4/1969 | Duff | 210/82 X |
| 3,493,112 | 2/1970 | Bradley | 210/107 |
| 3,574,509 | 4/1971 | Zentis et al. | 210/107 |
| 3,692,178 | 9/1972 | Reece | 210/82 |
| 3,826,368 | 7/1974 | Walters | 210/82 |

*Primary Examiner*—John Adee

[57] ABSTRACT

A filter apparatus comprises a filter screen for filtering liquid carrying solids to remove at least some of the solids from the liquid. A nozzle is arranged adjacent the filter screen for removing solids deposited on the filter screen during a filtering operation, a variable speed drive causes relative movement between the filter screen and the nozzle such that deposited solids are removed from successive portions of said filter screen, and a control unit controls the speed of the relative movement in dependence upon the degree of blockage of the filter screen by the solids deposited on the filter screen. Throttling the discharge of the filtered liquid causes liquid to flow from the side of the filter screen remote from the nozzle back through the screen into the nozzle which is provided with an inlet having an adjustable cross-sectional area for varying the flow therethrough. A cleaning system arranged to direct clean liquid through the filter screen into the nozzle is provided for cleaning the screen should the screen become completely blocked.

17 Claims, 4 Drawing Figures

FILTER APPARATUS

This invention concerns improvements in or relating to filter apparatus.

In many cases, particularly in the fields of pollution control, effluent treatment and sewage treatment, the separation of solids from liquids or the concentration of solids into a smaller volume of liquid has presented a problem which has been difficult to solve effectively where the nature of the solids to be removed or concentrated is such that a very thin layer of solids deposited on a filter media seals the passages therethrough to such a degree that the media becomes blocked or, to use an expression in common usage, "plugged". The plug point is normally defined as the point at which the flow of liquid through the contaminated filter media (with an acceptable pressure differential thereacross) is so low that the desired function of the filter apparatus virtually ceases.

One of the main reasons why solids which behave in the manner described have been regarded as virtually unfilterable, is that the time to reach the plug point can be so extremely short that the time to clean the filter media and put it back into use is many times greater than the time during which the filter media is actually in use.

It is one of the objects of the present invention to provide a filter apparatus with which such disproportionate time element may be reduced to an acceptable level or eliminated, thus making it a viable proposition to filter solids which have the ability to readily block the filter media.

According to the present invention there is provided a filter apparatus comprising a filter screen for filtering liquid carrying solids to remove at least some of the solids from the liquid, means arranged adjacent the filter screen for removing solids deposited on the filter screen during a filtering operation, variable speed drive means for causing relative movement between the filter screen and the deposited solids removing means such that in use deposited solids are removed from successive portions of said filter screen, and means for controlling the speed of said relative movement in dependence upon the degree of blockage of the filter screen by the solids deposited on the filter screen.

In order that the invention may be well understood an embodiment thereof, given by way of example only, will now be described, reference being had to the accompanying drawings, in which.

Figure 1:
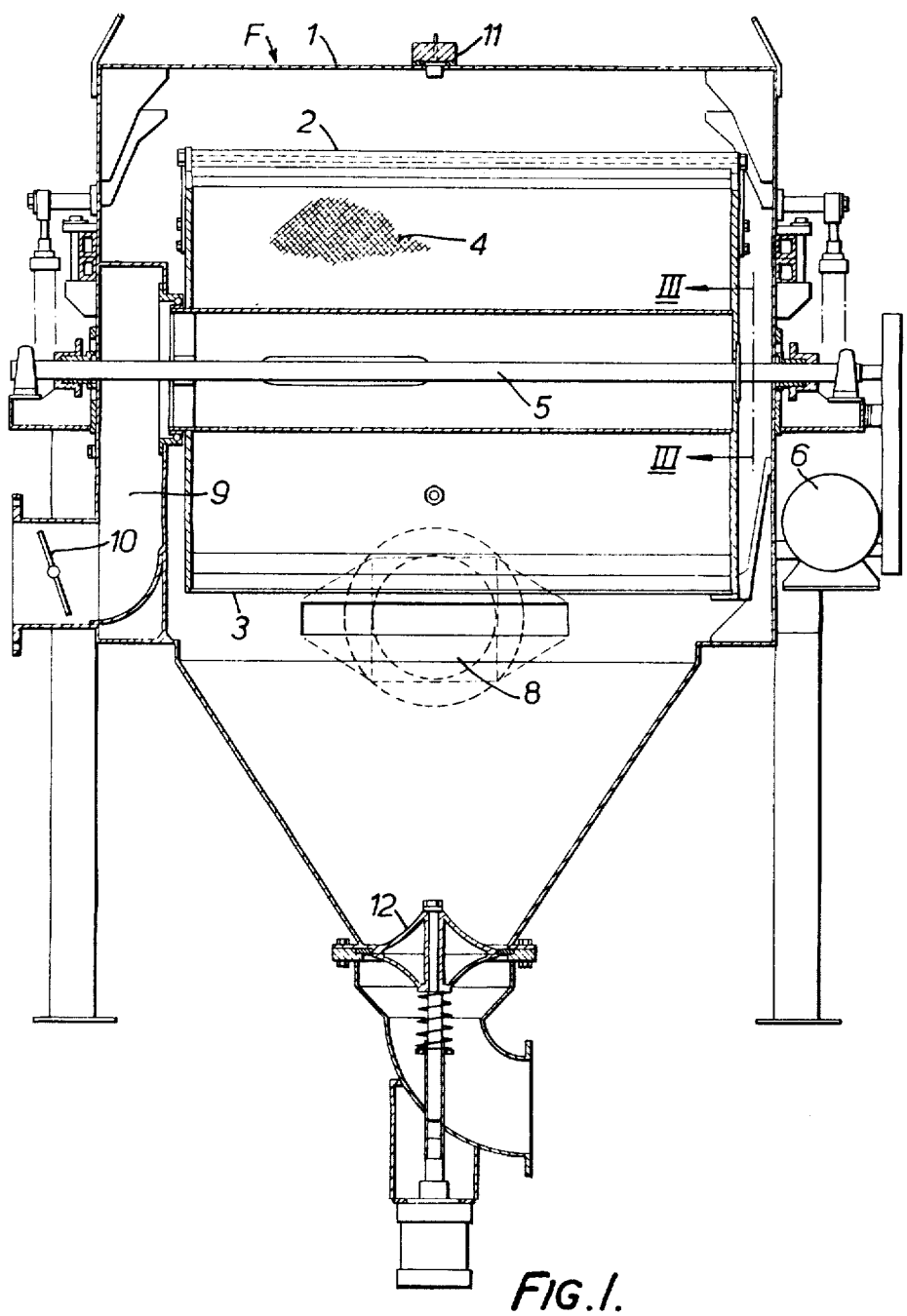
FIG. 1 is an axial sectional view of a filter apparatus including a rotatable filter drum.

Referring to FIG. 1, the filter apparatus (generally referenced F) depicted therein is of the same general character as that apparatus disclosed in the United Kingdom patent specification No. 1,184,066 corresponding to U.S. Pat. No. 3,493,112 which is incorporated herein by reference. Briefly, the filter apparatus F comprises a housing 1, a rotatable filter drum 2 which includes a filter screen 3 on which a filter media 4 is supported, the drum 2 being mounted on a shaft 5 rotatable by a motor 6, a nozzle 7 (shown in FIG. 3) mounted adjacent the horizontal centre line of the drum 2 and extending across the width thereof, a pump (not shown) for pumping liquid (containing solid contaminant) to be filtered via an inlet 8 through the screen 3 into the drum 2, a discharge pipe 9 through which the filtrate is discharged from the interior of the drum 2, a discharge valve 10 within the discharge pipe 9 for selectively providing various degrees of liquid flow into the nozzle 7 by which to flush solid contaminant deposited on the filter media 4 into such nozzle, a suction means (not shown) optionally provided in connection with the nozzle outlet to assist the flow of liquid thereinto, a vent valve 11 at the top of the housing 1, and a dump valve assembly 12 for removing filtered solids settling in the lowermost part of the housing 1. For further particulars of the filter apparatus F, reference is directed to the aforesaid patent specification.

As described in that patent specification, one method of operating the filter apparatus F (termed the "continuous back-flush method") entails revolving the filter drum 2 continuously and throttling the flow of filtrate so as to create a back pressure within the drum. More particularly, the discharge valve 10 is partially closed to cause such back pressure to such a degree that the pressure in the region between the housing 1 and the drum 2 is the highest, the pressure in the nozzle 7 is the lowest, and the pressure within the drum 2 is somewhere between the two. Thus, some of the flow passes directly from the region between the housing 1 and the drum 2 into the nozzle 7, and further of the flow passes from the region between the housing 1 and the drum 2 through the filter screen 3 into the drum 2 and back again through that screen into the nozzle 7. The former flow of liquid into the nozzle 7 effects a scouring action upon the filter media 4 and together with the latter (backflushing) flow loosens and removes solid contaminant settled on the filter media.

During operation of the filter apparatus using the so-called continuous back-flush method, since the filter drum 2 is rotating continuously, a given piece of filter media 4 is not in filtration use without being cleaned for more than one revolution, since it is cleaned each time it passes the nozzle 7. It will be appreciated that the filter media 4 is carrying the minimum amount of contaminant immediately after it has passed the nozzle 7 and the maximum amount of contaminant immediately before it reaches the nozzle. The cake of contaminant, therefore, on an annular strip of the filter media 4, although very thin, becomes increasingly thicker around the drum. If the quantity of contaminant becomes sufficiently thick for a given rotational speed of the filter drum 2 then (depending on the nature of the solid contaminant) what has been termed hereinbefore as the 'plug point' could be reached in less than one revolution of the drum. Since the contaminant would, thereafter, be deposited only on the 'unplugged' region of the filter media 4, the plug point would move progressively around the drum 2 in the opposite direction to drum rotation and eventually the whole of the periphery of the filter media would become blocked and ineffective. To avoid 'plugging' of the filter media 4 at any point, the rotational speed of the filter drum 2 is increased to more rapidly remove the solid contaminant and prevent the cake thereof becoming sufficiently thick that the phenomenon of plugging can take place.

If the volume of contaminant reduces, it is possible that the desirable thickness of cake to achieve the best quality of filtering may never be reached. In this case it would be desirable to reduce the speed of drum rotation so as to give a greater time for the cake to build up before it is removed.

An ideal condition of operation would obtain if the speed of the drum were to be such that under any condition of contamination, the filter media 4 were to be approaching 'plug point' at the moment the particular piece of media in question arrived at the nozzle 7 to be cleaned. Since, however, the volume of solid contaminant at any one time per unit volume of liquid may vary, one has to be satisfied with varying the speed of the drum to maintain as near as possible the ideal condition.

One feature of the embodiment is the provision of a control system which is operable to vary the speed of the filter drum 2 either by increasing or decreasing it from an optimum setting according to the increase or decrease respectively of pressure differential that will take place across the filter media 4 with varying quantities of contaminant thereon and, indeed, varying natures of contamination. Briefly, the control system comprises a pressure sensitive device operable to measure constantly the pressure differential across the filter media and to actuate mechanism to vary the setting of a variable speed drive (which may be of any suitable conventional type) for the drum in such a manner that an increase in pressure differential causes the drum speed to increase and a decrease in pressure differential causes the drum speed to decrease.

Figure 2:
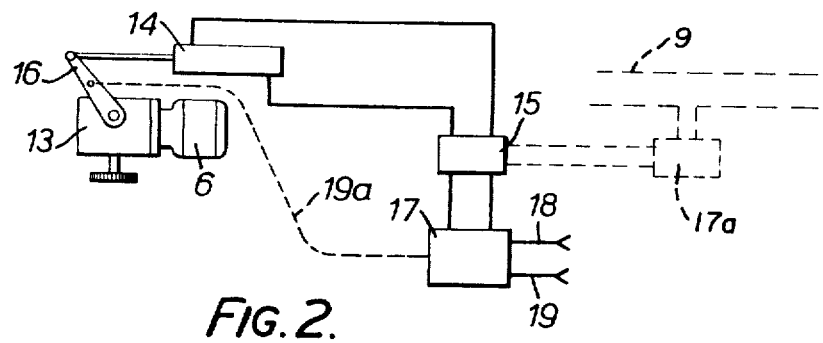
FIG. 2 shows diagrammatically a control system for controlling the speed of rotation of the filter drum shown in FIG. 1.

More particularly (and referring now to FIG. 2), the control system includes a variable speed drive 13 for transmitting the drive from the motor 6 to the shaft 5 on which the drum 2 is mounted. An actuator 14 which could, for example, be electrically or pneumatically operated, is controlled by a control unit 15 and serves to actuate a speed control lever 16 to control the output speed of the variable speed drive 13. The control unit 15 may also, for example, be electrically or pneumatically operated and its operation is initiated by a pressure sensitive device in the form of a pressure differential switch 17. That switch is connected via lines 18 and 19 to the interior of the drum 2 and to the region between the drum and the housing 1, respectively, to monitor the pressure differential across the filter media 4. As will be appreciated, that pressure differential is dependent upon the thickness of the cake of contaminant on the filter media.

The variable speed drive 13 is set to rotate the drum 2 at a speed which corresponds to an optimum predetermined pressure differential across the filter media 4. If the amount of contaminant in the liquid increases, the cake formed on the filter media thickens and the pressure differential across the filter media increases from the optimum value. The pressure differential switch 17 senses the increased pressure differential and automatically initiates operation of the control unit 15 with the result that the speed of the drum 2 is correspondingly increased to cause any given piece of the filter media to reach the nozzle more rapidly and so reduce the thickness of the contaminant cake just prior to the nozzle to that which will again give the optimum pressure differential across the filter media. The converse occurs if the amount of contaminant in the liquid decreases, the drum speed then being reduced to increase the thickness of the contaminant cake and so increase (and return) the pressure differential to the optimum level. A feed-back line 19a is provided from the control lever 16 to the pressure differential switch 17 to cancel the effect of a change in differential pressure when an appropriate movement of that lever has taken place.

Experiments have shown that the filter drum 2 may be revolved to give a linear speed of filter media 4 past the nozzle 7 of at least 2 feet per second. A drum, therefore, having a circumference of 10 feet would have its whole surface cleaned repeatedly every 5 seconds. Therefore, due allowance being made for the flow diminishing through that part of the filter media 4 carrying the maximum amount of contaminant, it is possible by the method described to effectively filter (and clean the filter media) on a continuous basis liquids containing solid contaminant that would "plug" a filter which is cleaned intermittently in a period of approximately 10 seconds. Thus, such contaminated liquid can be filtered on a continuous flow basis, whereas with a filter which has to be taken out of service for intermittent cleaning, even if the design were to permit cleaning in, say, 1 minute, the percentage of time for which the filter would be performing its filtering function would be only approximately 16%.

Instead of varying the speed of the filter drum in response to changes in the pressure differential across the filter media (to cope with different volumes or types of contaminant being deposited on the filter media), the filter drum speed could be varied as the rate of flow through the filter apparatus varies for such flow could be diminished in the event of the filter media becoming blocked and vice versa. To that end, for example, a device 17a (shown in broken lines in FIG. 2) for measuring the change of velocity of the filtrate flowing through the discharge pipe 9 (also shown in broken lines in FIG. 2) could be provided which gives a signal to result in an increase in drum speed upon a decrease in the flow rate and a decrease in drum speed upon an increase in the flow rate.

Cleaning of the filter media 4 may be performed more efficiently if the construction of the nozzle 7 is such that it encompasses a greater proportion of the surface of the drum 2 (compared with the nozzle disclosed in our aforementioned patent specification) and also permits the gap in the nozzle into which the back flushing flow passes to be adjustable in width. Thereby, the restriction to flow from the exterior of the drum into the nozzle is increased and, at the same time, it is possible to adjust the volume of the back flushing liquid flowing into the nozzle (by adjusting the gap through which the liquid is caused to flow into the nozzle).

In order to understand why the described construction of the nozzle is advantageous, it is necessary to appreciate that the principal factor that determines the effectiveness of the cleaning of the media by the nozzle is the velocity of that part of the liquid passing through the media into the nozzle, and that this velocity is dependent upon the pressure causing the flow into the nozzle. It is, accordingly, desirable that as much flow as possible into the nozzle comes from the inside of the drum and as little as possible from the space between the drum and the casing. It is also to be appreciated that it is normally desirable that the contamination removed from the filter by the nozzle is entrained in the minimum volume of liquid that can be achieved. If, therefore, a given velocity of flow into the nozzle is required for cleaning, the volume of flow may be reduced whilst maintaining the velocity if (a) the restriction from outside the drum into the nozzle is as high as possible so that most of the flow comes from inside the drum, and (b) the gap of the nozzle is as small as possible. If the gap is made too small, the time for which any particular segment of media is in line with the gap would be so short that it is insufficient for the contamination to be removed from the media and carried into the nozzle; furthermore, the actual gap found to be practical can vary according to the type or density of the sludge being filtered. Therefore, the gap should be adjustable.

Figure 3:
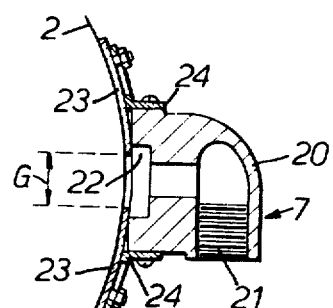
FIG. 3 is a fragmentary section along the line III—III of FIG. 1.

Such a construction of the nozzle 7 is depicted in FIG. 3. Therein, the nozzle is shown as having a body 20 with an outlet 21 in communication with an inlet in the form of an elongate slot 22. The effective width of the gap G through which liquid can backflush into the nozzle 7 via the slot 22 is determined by a pair of plates 23, one on each side of the slot, which are secured by brackets 24 to the body 20. Each of the plates 23 is bolted to the respective bracket 24 which is slotted to permit the plate to be moved across the slot 22 so that the width of the gap G can be adjusted. The plates 23 are curved to conform to the curvature of the filter drum 2 and so inhibit flow from the exterior of the drum into the nozzle.

A further feature of the embodiment is the provision of a safety or emergency system for cleaning the filter media, either by manual or automatic operation, in the event that the entire filter media becomes 'plugged', possibly through malfunctioning of some vital component in the filter apparatus.

Briefly, the cleaning system operates, upon the blocked condition of the filter media obtaining, to pass liquid under pressure from a clean liquid supply through the filter media from the inside of the filter drum thereby to flush away contaminant from the filter media into the nozzle.

Figure 4:
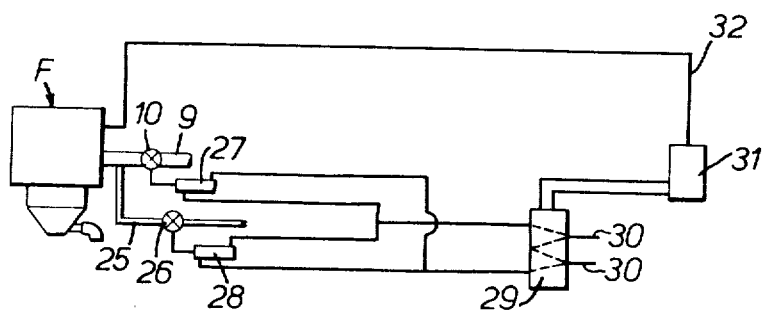
FIG. 4 shows diagrammatically a system for initiating the cleaning of the same filter drum when the drum becomes "plugged".

More particularly, and referring to FIG. 4, there is provided a pipe 25 for supplying clean liquid under pressure into the filtrate discharge pipe 9 upstream of the discharge valve 10. Where water or a water based liquid is being filtered, the supply pipe 25 can be connected to a suitable mains water supply. Since the flow of clean liquid required is small, the supply pipe 25 is fitted with a valve 26 for controlling the degree of flow therethrough. Operation of the discharge valve 10 is controlled by an actuator 27 and operation of the valve 26 is controlled by an actuator 28. Those actuators, which are pneumatic cylinders, are connected to a control unit in the form of a solenoid operated valve 29. The valve 29 is connected to air supply lines 30 and arranged so that when the discharge valve 10 is closed, the valve 26 is open. A pressure switch 31 which controls the operation of the valve 29 is connected via a pipe 32 to the region in the filter apparatus F between the housing 1 and the filter drum 2.

In the event that the filter media 4 becomes completely blocked, pressure will rise in the region between the housing 1 and the filter drum 2 but no pressure will be developed inside the drum to perform the backflushing operation. When the pressure in said region increases to a predetermined value, the pressure switch 31 operates the valve 29 which causes the actuators 27, 28 to close the discharge valve 10 and open the valve 26, respectively. Thus, the interior of the drum 2 is supplied with clean liquid from the pipe 25, and as soon as the pressure of that liquid in the drum is sufficient to cause a flow from inside the drum into the nozzle 7 that portion of the filter media 4 in line with the nozzle at that time will be cleaned. Once past the nozzle 7, the clean portion of the filter media 4 allows free flow of the unfiltered liquid from said region into the drum 2. Normal cleaning will then take place using liquid from the region between the housing 1 and the drum 2 as the source of supply, and after one revolution of the drum the pressure in that region falls below said predetermined value to cause the pressure switch 31 to effect closure of the valve 26 and opening of the discharge valve 10. The filter media 4 having been cleaned, the normal continuous backflushing method of operation of the filter apparatus is resumed.

It will be appreciated that although the discharge valve 10 and valve 26 are automatically actuated in the control system of FIG. 4, they could be manually operable instead.

It will further be appreciated that if the filter apparatus is intended to be operated solely in accordance with the continuous backflushing method, which method entails the discharge valve 10 being maintained partially closed to create the necessary back pressure in the filter drum, the valve 10 could be replaced by a simple fixed throttle plate.

If such a fixed throttle plate is used, it will be necessary to provide additionally in the discharge pipe 9 a movable flow control valve (if the system of FIG. 4 is used) either manually or automatically (by the actuator 27) actuated.

I claim:

1. A filter apparatus comprising a housing, a filter screen disposed in said housing for filtering liquid carrying solids to remove at least some of the solids from the liquid, nozzle means disposed in said housing and arranged adjacent said filter screen for removing solids deposited on said filter screen during a filtering operation, drive means for causing relative movement between said filter screen and said nozzle means such that in use deposited solids are removed from successive portions of said filter screen, means for causing liquid to flow from the side of said filter screen remote from said nozzle means back through said filter screen into said nozzle means, and means for adjusting the flow of liquid back through said filter screen into said nozzle means, said nozzle means comprising an elongated nozzle positioned laterally of the direction of said relative movement, and said adjusting means comprising elongated members defining an elongated inlet to said nozzle, the relative positions of said elongated members being adjustable for adjusting the width of said elongated inlet, said elongated members being shaped to cooperate closely with the adjacent surface of said filter screen so as to inhibit the flow of liquid into said nozzle directly from the side of the filter screen on which nozzle is disposed.

2. A filter apparatus as claimed in claim 1, wherein said filter screen is mounted on the periphery of a rotatable drum member and the drive means is arranged to rotate the drum member such that the filter screen is moved past the solids removing means.

3. A filter apparatus as claimed in claim 1, wherein means are provided for carrying liquid to flow from the side of the filter screen remote from the nozzle means back through the filter screen into the nozzle means.

4. A filter apparatus as claimed in claim 3, wherein said means for causing the liquid to flow into said nozzle means comprises a means for throttling the discharge of the filtered liquid from the apparatus to cause a back pressure on that side of the filter.

5. A filter apparatus as claimed in claim 1 wherein said drive means is a variable speed drive means, and further comprising means for automatically controlling the speed of said relative movement in dependence upon the degree of blockage of said filter screen by the solids deposited thereon.

6. A filter apparatus as claimed in claim 5, wherein said control means includes means for providing a measure of the degree of blockage of the filter screen, said control means being arranged to decrease the speed of the drive means when the means for providing said measure indicates that the degree of blockage has fallen below a predetermined value and to increase said speed when the means for providing said measure indicates that said degree of blockage has risen above said predetermined value.

7. A filter apparatus as claimed in claim 6, wherein said means for providing said measure comprises means for determining the pressure differential across the filter screen, said control means being arranged to increase the speed of said drive means when the pressure differential falls below a predetermined level and to increase said speed when the pressure differential rises above said predetermined level.

8. A filter apparatus as claimed in claim 6, wherein said means for providing said measure comprises means for determining the rate of flow of the filtrate, said control means being arranged to increase the speed of said drive means when the rate of flow falls below a predetermined level and to decrease said speed when the rate of flow rises above a predetermined level.

9. A filter apparatus as claimed in claim 6, further including feedback means from said variable speed drive means to said control means, for cancelling the effect of the control means when an appropriate speed change has taken place.

10. A filter apparatus as claimed in claim 5 further comprising first means for automatically preventing the discharge of the filtered liquid when a predetermined degree of blockage is reached to effect positive back flushing of the portion of said filter screen adjacent said nozzle means.

11. A filter apparatus as claimed in claim 10 further comprising second means for injecting clean liquid into said housing through said filter screen and into said nozzle means to assist said positive back flushing when said discharge is automatically prevented.

12. A filter apparatus as claimed in claim 11 further comprising means for discharging the filtered liquid from said housing, and wherein said first and second means comprise first and second valves, respectively, located in said discharge means, said second valve being located upstream of said first valve.

13. A filter apparatus as claimed in claim 11 wherein said first and second means are automatically operable in response to a means for indicating that the solids deposited on the filter screen are preventing the flow of liquid to be filtered through the filter screen.

14. A filter apparatus as claimed in claim 12, wherein said first valve comprises a throttling valve for throttling the discharge of the filtered liquid from said housing during a filtering operation to cause a back pressure on that side of the filter screen which is remote from the nozzle means.

15. A filter apparatus as claimed in claim 13, wherein said indicating means comprises a pressure responsive device arranged to respond to the pressure of the unfiltered liquid in the apparatus.

16. A filter apparatus as claimed in claim 15, wherein the pressure responsive device controls actuating means for operating said first and second means.

17. A filter apparatus as claimed in claim 1 further comprising a line for discharging filtered liquid from said housing, first valve means in said discharge line for throttling the discharge of the filtered liquid from said housing during a filtering operation to cause a back pressure on the side of said filter screen remote from said nozzle means, said first valve means being manually operable into a closed position for preventing the discharge of the filtered liquid to effect positive back flushing of the portion of said filter screen adjacent said nozzle means, and second valve means connected to said discharge line and being manually operable for introducing clean liquid into said discharge line upstream of said valve means, whereby clean liquid introduced into said discharge line through said second valve means when said first valve means is in its closed position is directed through said filter screen into said nozzle means to assist said positive back flushing of said portion of said filter screen.

* * * * *